July 21, 1936.　　　A. M. STENGER　　　2,048,523
RAILROAD MOUNTING FOR PORTABLES
Filed Sept. 13, 1934
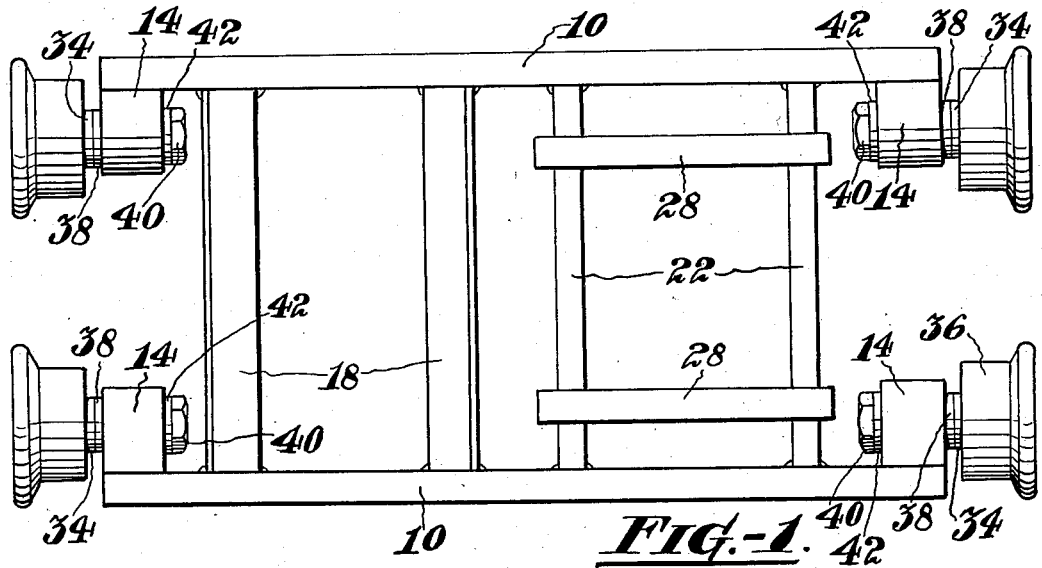
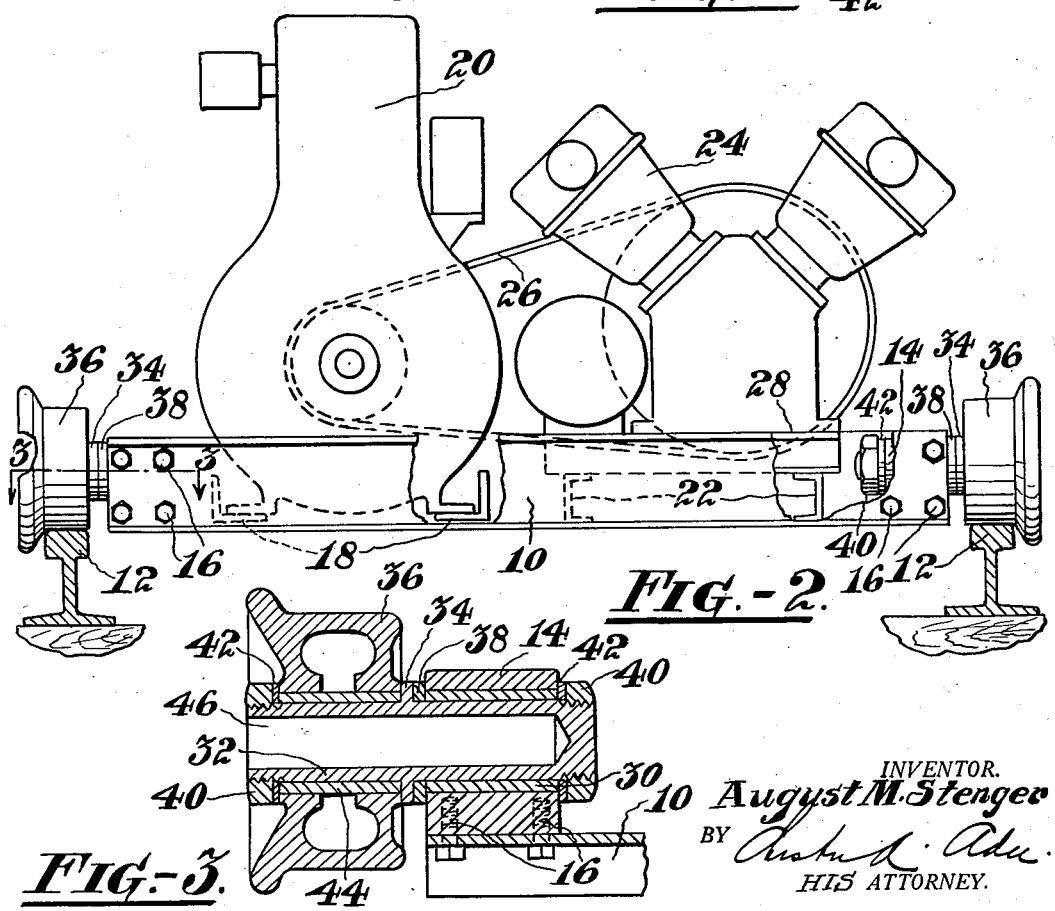
INVENTOR.
August M. Stenger
BY
HIS ATTORNEY.

Patented July 21, 1936

2,048,523

UNITED STATES PATENT OFFICE 2,048,523

RAILROAD MOUNTING FOR PORTABLES

August M. Stenger, Painted Post, N. Y., assignor to Ingersoll-Rand Company, Jersey City, N. J., a corporation of New Jersey Application September 13, 1934, Serial No. 743,783

2 Claims. (Cl. 105—162)

This invention relates to railway trucks and particularly to railway trucks of a type adapted to carry relatively light equipment for furnishing power for power operated tools employed in railway construction and maintenance work. The desirability of so constructing such equipment that it may be moved upon the rails from place to place and easily removed from the tracks in order to avoid obstruction to traffic when not being transported is well understood.

It is an object of this invention to provide a wheeled chassis for compressors, transformers, generators, and the like of light, but sturdy construction so that it may be taken from and restored to the rails with a minimum expenditure of time and man power. Other objects are either apparent or will be clear from the following description.

The construction and operation of the invention may be best understood by reference to the accompanying drawing of which:

Fig. 1 is a plan view of the wheeled chassis incorporating the invention;

Fig. 2 an end view of the chassis mounted upon which is shown diagrammatically an engine driven compressor, and;

Fig. 3 a section of a wheel and its axle taken on the line 3—3 of Fig. 2 looking in the direction of the arrows. This figure illustrates a detail of the preferred construction.

In the drawing a pair of transverse structural members 10, shown as of channel bar form, but which may be of any suitable form or material, extend between the rails 12. At each end of each transverse member 10 is an axle box 14 which may be attached thereto by bolts 16 as shown, or by any method suitable to the materials employed.

The transverse members 10 are necessarily inter-connected by other, preferably longitudinal, structural members to form a rigid frame. These members may be of any type and of any form particularly adapted to the use to which the truck is to be put. In the embodiment illustrated two members 18 of angle iron form a suitable bed for a gasoline engine 20, and two channel members 22 form a bed for a compressor unit 24 which may be driven by a belt 26 from the engine 20. Additional rigidity of the frame may be secured by additional structural members as the bars 28.

Each axle box 14 contains a bearing member 30 within which any suitable axle may be mounted. For lightness an individual stub axle 32 for each box is recommended. The form illustrated is simple and inexpensive and possesses a further advantage which will be pointed out hereinafter.

The axle 32 is provided with a central external flange 34 which acts at once as a limiting seat for a wheel 36 and as a bearing face for a washer 38. Each end of the axle is threaded to engage nuts 40. One end of the axle passes through the washer 38 and the bearing 30 in the axle box 14 and is then locked against endwise motion by taking up a nut 40 upon a washer 42. The flanged wheel 36, in whose hub is preferably seated a bearing 44, is then placed upon the axle and secured there by the wheel nut 40 and washer 42.

A recess or bore 46 is provided in the axle 32 into which the end of a lever such as a length of pipe, crowbar, or the like (not shown) may be thrust to provide leverage for workmen to lift one side of the assembly.

It will be noted at once that, contrary to usual practice the wheels 36 are shown mounted with the flanges on the outside of the rails. The purpose of this is to facilitate removal of the truck from the rails. The position of the axle boxes 14, and the size of the wheels 36 should be such that the bottom surface of the transverse members 10 should be substantially in the same plane as the running surface of the wheels 36, which, of course, is the level of the rail 12. It is permissible to have the lower surface of the members 10 slightly higher than surface of the rail, but if it is materially lower it will defeat the purpose of the construction.

Having regard to the foregoing disclosure it is apparent that two men on one side of the truck, each having a pipe or crowbar, one end of which is seated in the recess 46 of the axle 32 may easily tilt the truck to such an angle that its mass will cause the far wheels, the flanges of which can not oppose the movement, to slide off the rail. The transverse members 10 slide upon the rail, functioning as skids or sled runners. After the truck has been moved sideways a short distance the workmen may walk through an arc of 90° and lower their burden so that all four wheels are outside the rails and at a right angle thereto. The truck may then be easily pushed off the right of way upon a temporary track of planks or the like.

Having thus described my invention I do not desire to be restricted to the specific form illustrated, but claim:

1. A wheeled railway truck having flanged wheels arranged with the flanges on the outside of the rail, a frame in which the lowermost surface of the transverse members is substantially at the level of the running surface of the wheels to facilitate the use of the transverse members as skids in removing the truck from the rails, and axles for the wheels having recesses in the outer ends thereof to receive levers whereby the truck may be tilted to permit the wheels on the low side to slide off the track thereby enabling the transverse members of the truck to rest upon the track.

2. A truck for railways comprising a rigid frame having transverse members adapted to serve as skids in removing the truck from the rails, and flanged wheels for the frame supported by the ends of the transverse members and mounted with the flanges on the outside of the rails to facilitate sliding the truck sideways off the track, said truck having recesses adjacent the ends of the transverse members and extending longitudinally of said transverse members to receive levers whereby the truck may be tilted for removing it from a track.

AUGUST M. STENGER.